United States Patent [19]
Barrett et al.

[11] Patent Number: 5,185,797
[45] Date of Patent: Feb. 9, 1993

[54] ENCRYPTED TRUNKED CONTROL CHANNEL SYSTEM

[75] Inventors: Steven T. Barrett, Plantation, Fla.; Kevin M. Laird, Haltom City, Tex.; Richard E. Murray, Coral Springs, Fla.; James M. O'Connor, N. Richland Hills, Tex.

[73] Assignee: Motorola, Inc., Schaumburg, Ill.

[21] Appl. No.: 676,019

[22] Filed: Mar. 27, 1991

[51] Int. Cl.⁵ .......................... H04L 9/02; H04K 1/00; H04K 9/00
[52] U.S. Cl. ........................................ 380/21; 380/28; 380/48
[58] Field of Search ......................... 380/20, 21, 28, 48

[56] References Cited

U.S. PATENT DOCUMENTS

| | | | |
|---|---|---|---|
| 4,322,745 | 3/1982 | Saeki et al. | 380/20 |
| 4,440,976 | 4/1984 | Bocci et al. | |
| 4,833,710 | 5/1989 | Hirashima | 380/20 |
| 4,882,751 | 11/1989 | Kotzin et al. | |
| 5,091,938 | 2/1992 | Thompson et al. | 380/21 |

Primary Examiner—Stephen C. Buczinski
Attorney, Agent, or Firm—Pedro P. Hernandez

[57] ABSTRACT

A trunked communication system (400) transmits and receives encrypted signals over the system control channel (402). The trunked system (b 400) includes a plurality of radios (300) which can communicate with the communication system via control channel (402). By using control information signals and system information signals radios (300) can determine if it they are capable of decrypting the encrypted control information signals sent over the control channel (402). This is done by first determining if the encryption identification field found in the unencrypted system information signal matches an encryption identification field found in radio (300). If a match is found between the radio's encryption identification and the encryption identification field in the system identification signal radio (300) loads the encryption into the encryption circuitry in order to successfully decrypt the control information signals.

12 Claims, 4 Drawing Sheets

ENCRYPTED TRUNKED CONTROL CHANNEL SYSTEM

CROSS REFERENCED APPLICATIONS

This application is related to an application entitled "Trunked Radio Communication System Having Encrypted System Control Information" by inventors Hess et al. filed on May 7, 1990 and having Ser. No. 07/519,615.

TECHNICAL FIELD

This invention relates to communication systems, and more particularly to trunked radio frequency communication systems utilizing encryption.

BACKGROUND

Trunked radio communication systems are well known in the communication system art. In such systems, groups of communication devices such as portable radios and mobiles communicate with each other over a group of radio frequencies (channels). Typically, trunked communication systems have a specific number of voice/data communication channels which are dynamically allocated between different groups of radios in the system by a system central controller. In a trunked communication system such as the Motorola SMARTNET TM system, the system central controller communicates over a control channel to all of the radios in the system in order to coordinate the activities of all the radios. The control channel in a trunked system is normally one of the radio frequency channels (repeaters) which has been designated to be the control channel. The messages transmitted over the control channel by the system central controller include: messages directing a specific group of radios to a specific system voice channel (repeater), messages from the radios in the system to the system central controller requesting the controller to assign them a voice channel, system identification information from the central controller to the radios, and other related information.

In trunked systems where protection of the voice/data messages is important, a system like the Motorola Digital Voice Protection System can be added to the individual radios in the system. The Digital Voice Protection System is an encryption system that converts an analog communication signal into a digital bit stream and then scrambles (encrypts) the digital bit stream with a technique to which only the sender and authorized receivers are given "keys" which allow the signal to be decrypted. If an eavesdropper tries to listen to conversations on this type of system, the encrypted messages will be able to be received but the messages will sound like pseudorandom noise unless the eavesdropper has the proper key to decrypt the message. Unfortunately, in present day trunked systems only the voice communications between radios on the system are encrypted (i.e. voice channel traffic). Data transmissions containing control and status information are not encrypted.

Since trunked systems like the SMARTNET TM system transmit the majority of the system control information via the control channel, an eavesdropper can gain valuable information as to the amount of traffic, the number of radios on the system, channel assignments, and other related information since the control channel is not encrypted in present day trunked communication systems. One of the major reasons why the trunked control channel is not encrypted is due to the fact that different groups of radios on a trunked system may be using different encryption algorithms and/or encryption keys at the same time. For example, radio group "A" may be using one encryption key for their communications, while group "B" may be using another encryption key, thereby not allowing for the control channel signals to be encrypted due to the encryption key incompatibility of the different radio groups. The problem is even more pronounced when different radio groups on a system are using different encryption algorithms (i.e. DVP-XL, DES-XL).

A need exists for a system and radios which can operate in a system where the control information carried by the control channel is also encrypted in order to protect the entire integrity of the trunked communication system from unwanted eavesdropping.

SUMMARY OF THE INVENTION

The trunked communication system includes a plurality of communication devices and a control resource for controlling the plurality of communication devices in the system using control information signals and system information signals. The control information signals being encrypted while the system information signals are unencrypted and include an encryption identification field in order to inform the plurality of communication devices as to the encryption being used to encrypt the control information signals.

DETAILED DESCRIPTION OF THE PREFERRED EMBODIMENT

Figure 3:
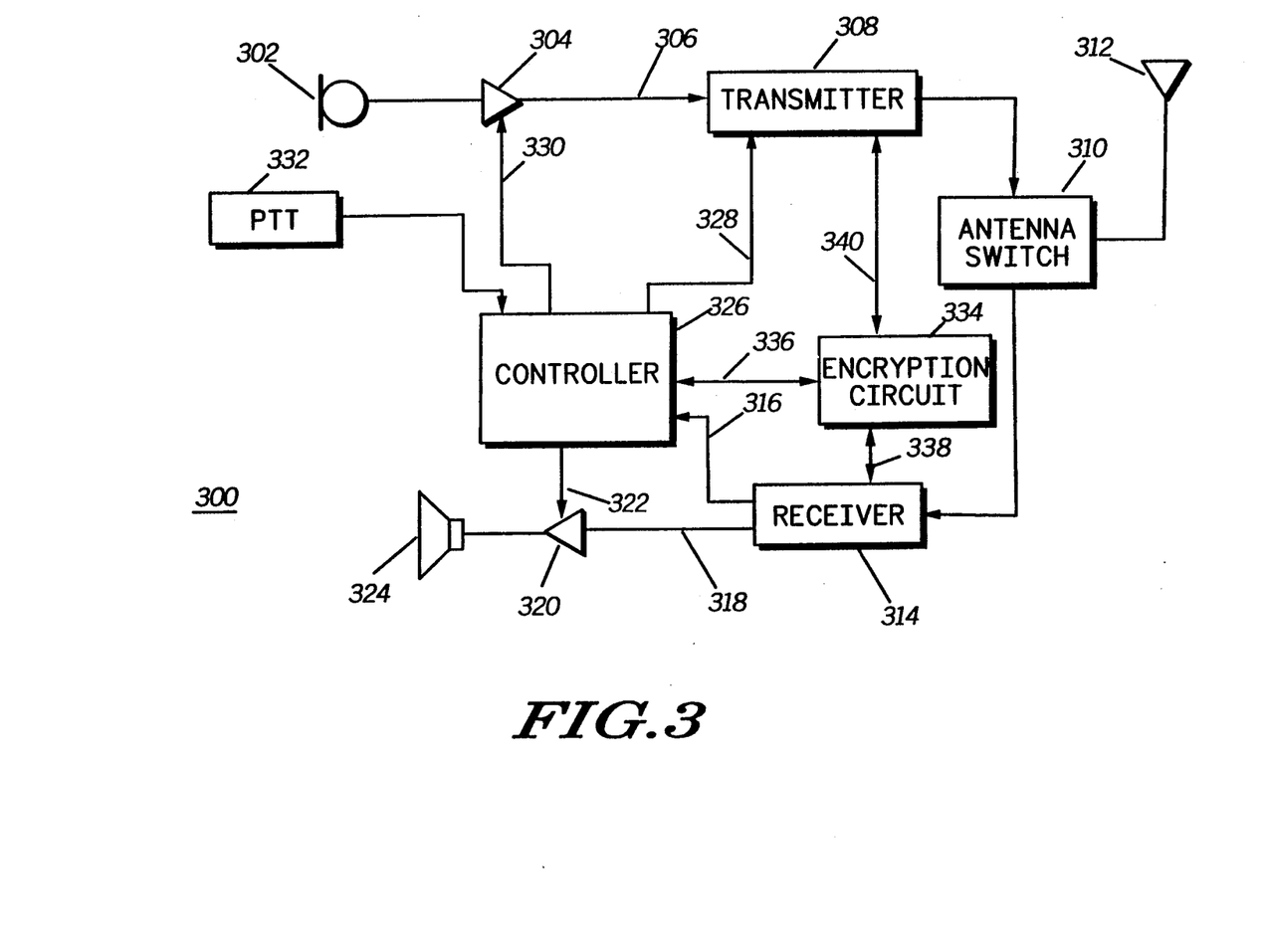
FIG. 3 shows a block diagram of a radio in accordance with the present invention.

Referring now by characters of reference to the drawings and first to FIG. 3, a block diagram of a conventional radio 300 such as a portable radio capable of operating in a trunked communication system is shown. Radio 300 includes a receiver 314 which is used for receiving information from other communication devices and systems. Antenna switch 310 selectively couples antenna 312 to either receiver 314 or transmitter 308 depending on the condition of radio 300. Both receiver 314 and transmitter 308 are of conventional design as known in the art.

When receiving a normal control channel data message, the received radio frequency signal is routed from antenna 312 to receiver 314 where the signal is decoded. Receiver 314 then sends the information which is in the form of data to controller 326 where the data is manipulated and buffered. Controller 326 will then proceed to interpret the data which is normally in packets (called outbound signalling words or OSW's) having a predetermined number of bits, if the controller is not able to interpret the information it assumes that the information is encrypted and sends the data via bus 336 to encryption circuit 334. Encryption circuit 334 then attempts to decrypt the data using the encryption which is currently selected in the radio. Encryption here means a specific encryption algorithm (i.e. DES-XL, DVP-XL, etc.) and a specific encryption "key" used to scramble the algorithm. Encryption circuit 334 can contain a number of different encryption algorithms which are normally self contained in electronic hybrids and a number of encryption keys used in scrambling the different algorithms. Each unique encryption algorithm/key combination will have a unique pointer called an encryption identifier which is used to identify and select the specific encryption.

Preferably, encryption circuit 334 has one encryption algorithm (i.e. DES-XL) which is normally in the form of an electronic hybrid circuit and a plurality of keys which can be loaded into the hybrid in order to scramble the algorithm. Each of the keys have a unique encryption identifier. Whenever radio 300 selects a new encryption, the selected key will be automatically loaded into the hybrid. Radio 300 could also have a plurality of encryption algorithms such as DES-XL, DVP-XL and a plurality of keys which could be loaded into one of the selected algorithms.

Encryption circuit 334 uses the selected encryption which basically performs a decryption algorithm to the data. The data is then sent back via bus 336 to controller 326 where controller 326 again tries to decode the information. If controller 326 is successful in interpreting the data, it then determines the contents of the data in order to perform whatever the data is instructing radio 300 to perform. For example, the data might be informing radio 300 to change frequencies in order to communicate with other radios in a predetermined voice channel (repeater).

Controller 326 in the present is in charge of coordinating all the activities of radio 300 including the control of both transmitter 308 and receiver 314. Controller 326 preferably comprises a conventional microprocessor or microcontroller, having on-chip memory, I/O lines, and the capability for external memory device interfacing. In a trunked radio, like radio 300, controller 326 controls the switching of frequencies for both the transmitter 308 and receiver 314 depending on instructions which come from the system central controller 404 (shown in FIG. 4) over the system control channel 402 in the form of OSW's which are data packets transmitted by controller 404. The OSW's which are received by radio 300 take the form of information that controller 326 needs to process further, such as information signals informing the controller to switch the radio's channel assignment, etc. In the present invention controller 326 also operates as the decoding means for deciding if the radio is capable of decoding the encrypted information signals which are coming in from the trunked system control channel 402.

Normal voice traffic coming from antenna 312 in the form of RF are routed to receiver 314 in order to be decoded. If the information is determined to be encrypted the data is sent to encryption circuit 334 via bus 338 where it is decrypted and sent back to receiver 314 via bus 338. The determination that an incoming message is encrypted can be carried out by a circuit such as that disclosed in U.S. Pat. No. 3,995,225 which could be located in receiver 314 and is hereby incorporated by reference as if set forth fully within. The analog voice signal is then sent via line 318 through audio amplifier 220 where the signal is amplified and presented to speaker 324. Controller 326 can control the volume of the output audio signal by adjusting the gain of amplifier 320 via line 322 which is normally controlled by the user via a volume switch (not shown).

In order for radio 300 to transmit a normal voice message once the radio is assigned a voice channel, the PTT switch 332 is activated by the radio user which in turn activates transmitter 308 via a signal coming from controller 326 via bus 328. During a normal voice transmission, the radio user speaks into microphone 302 which converts the audio signal to electrical signals which are in turn amplified by amplifier 304. Amplifier 304 has gain adjustment capability via line 330 which is controlled by controller 326. The amplified signal is then fed to transmitter 308 which converts the signal to a radio frequency signal and transmits the signal through antenna switch 310 to antenna 312. If the transmission is required to be encrypted, the signal is routed via bus 340 to the encryption circuit 334 prior to its transmission, where it is there encrypted and sent back to transmitter 308 for transmission.

Figure 4:
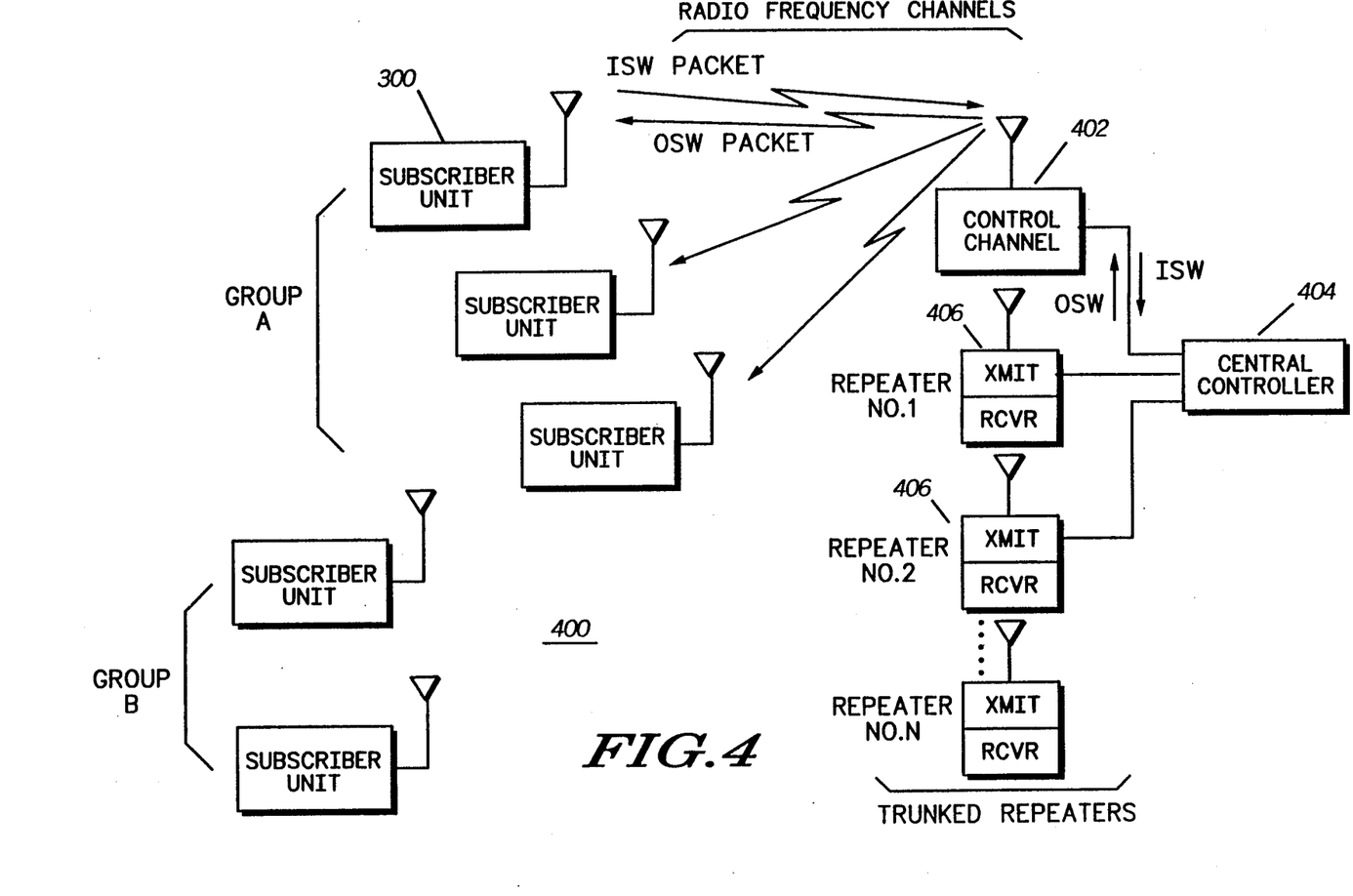
FIG. 4 is a block diagram of a communication system in accordance with the present invention.

Messages which radio 300 needs to send specifically to the trunked system central controller 404 are sent via the control channel 402 and are normally sent in the form of data packets called inbound signalling words (ISW's) which are data packets having a predetermined number of data bits. In the present invention the ISW's are preferably encrypted using the selected radio encryption which is found in encryption circuit 334 prior to transmission. A typical ISW will be generated in controller 326 which is responsible for generating ISW's which inform the trunked system as to the radio's present condition. Once controller 326 has formatted the ISW to be transmitted the data is sent via bus 336 to encryption circuit 334 which encrypts the data with the presently selected encryption. The encrypted data is then sent via bus 340 to transmitter 308 where it is transmitted. Controller 326 informs transmitter 308 to transmit the data via an information signal sent by controller 326 over bus 328.

In FIG. 4 a block diagram of a typical trunked communication system is shown. The radios or subscriber units 300 which are part of system 400 communicate over control channel 402 with the system central controller 404 in order to receive status and control information from the central controller 404. The system central controller 404 acts as the system coordinator and is responsible for assigning radios 300 to different repeaters 406 (channels) so that they may communicate amongst each other. The central controller 404 is also responsible for knowing where each of the radios are located (i.e. what voice channel) and for controlling other features typically found in a modern trunked communication system (e.g. handling phone patches, coordinating groups of radios in emergency situations, etc.). The typical central controller 404 includes a main processing unit such as a computer with appropriate control software which controls the operation of controller 404. Also normally included as part of controller 404 is a video display and keyboard in order to allow the central control operator to communicate with the system. In the present invention, central controller 404 also includes conventional encryption circuitry in order to encrypt signals sent by central controller 404, and decrypt encrypted signals sent by radios 300. The signals which are sent from the central controller 404 to the subscriber units over the control channel 402 are typically called outbound signalling words ("OSW's"). The control signals going from radios 300 to the central controller 404 are called inbound signalling words (ISW's). OSW's inform radios 300 when to change channels automatically so as to communicate with other members in the same radio group over an assigned voice channel 406 which has been assigned by the system central controller 404.

An example of a typical trunked conversation will begin by one radio 300 in group "A" pressing PTT which automatically sends an ISW over the control channel 402 to the central controller 404 requesting a voice channel 406 grant. Once the request comes in, central controller 404 decides which voice channel 406 to assign and transmits an OSW via control channel 402 back to the radios 300. The OSW will inform all radios 300 in group "A" to move to repeater No. 2 for example, at which point all the radios in group "A" will move to that repeater to begin their conversation.

Figure 1A:
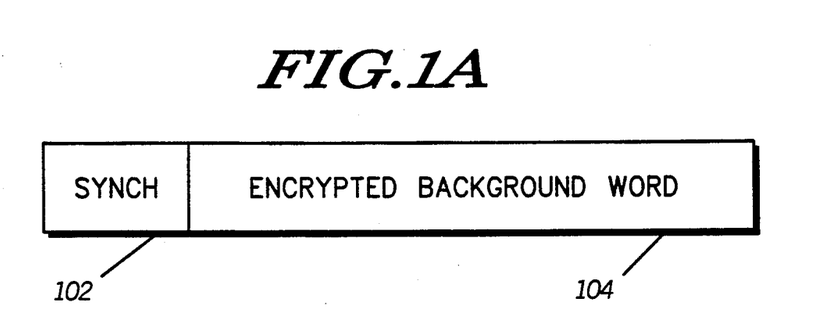
FIG. 1A shows a block diagram of an encrypted background status packet in accordance with the present invention.

In FIG. 1A a block diagram of an encrypted background word or packet in accordance with the present invention is shown. Background packets are normally transmitted by the system central controller 404 on a continual basis anytime there is no traffic or information activity going on over control channel 402. The main purpose of the background word in a trunked system 400 is to insure that the radios 300 in the system stay "in synch" with the control channel 402. For example, a trunked radio 300 which is put into operation and which is in range of trunked system 400 will scan the control channels it has been programmed to work with and look for background word activity in order to get in synch with a system control channel 402.

In prior art systems, the background words were all unencrypted since no information flowing through control channel 402 was encrypted for the reasons discussed previously. In the present invention the background word packets are encrypted except for an unencrypted synch preamble 102. The encrypted background word in FIG. 1A has a synch preamble 102 which is not encrypted and is appended to the front of the background word in order to allow the radios 300 receiving the background word enough time to synchronize with the encrypted background word field 104. Background word field 104 is made up of status bits which inform radio 300 that the packet is a background word, and other bits which are basically synch bits used by radios 300 in order for them to remain in synch with control channel 402.

When radio 300 receives the incoming background word and controller 326 attempts to decode the information, if controller 326 is not successful in decoding the data it sends the data to the encryption circuit 334 where the data is attempted to be decrypted using the presently selected encryption (i.e. the encryption which is presently being used by radio 300). Upon receiving the decrypted data if controller 326 is successful in interpreting the background data bits it then knows that the correct encryption is being used. If controller 326 again can not successfully interpret the data it then knows that the presently selected encryption is not the encryption being used by trunked system 400. At this point radio 300 will keep decrypting control channel OSW's awaiting an unencrypted system information signal (shown in FIG. 1B).

Figure 1B:
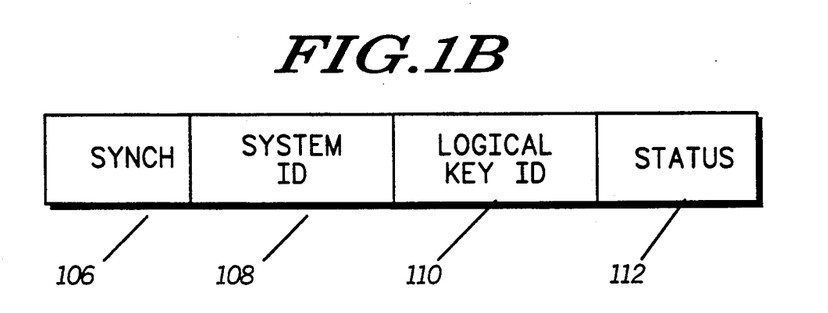
FIG. 1B shows a block diagram of an unencrypted system information signal in accordance with the present invention.

FIG. 1B illustrates a block diagram of an unencrypted system information signal (status OSW packet) in accordance with the present invention. The system information signal will preferably contain a system ID field 108 which informs radios 300 of that particular system's identification number. For example, a system 400 which has an identification number of "10" will send the identification number of "10" in the system ID field 108. System ID field 108 helps radios 300 match the systems that they are allowed to be in with the system ID in the system ID segment 108. Trunked radios 300 normally store a list of system ID's in their controller's memory locations (controller 326) which they scan upon first detecting a system information signal in order for the radios to guarantee that they are in an appropriate trunked system. This is especially required in geographical areas which have many adjacent trunked systems which have radios roaming between systems.

The next field in the status OSW packet of FIG. 1B is the encryption identification field 110 which is also known as the logical key identification field. The encryption identification field 110 is an identification number or pointer which informs radios 300 that are decoding the unencrypted system information signals as to the encryption which is being used to encrypt/decrypt the background word packets (shown in FIG. 1A) and the control information signals (shown in FIG. 1C). Encryption is defined here to mean the encryption algorithm, encryption key, or combination algorithm and key which is being used to encrypt the background word packets and the control information packets (those shown in FIGS. 1A and 1C). Once a radio 300 decodes the status OSW packet and determines that the system ID matches a system ID found in the radio, the next decision radio 300 has to make is to determine if it also has the encryption which is being used to encrypt the control channel signals in particular the background word packets of FIG. 1A and the control information signals of FIG. 1C. Radio 300 will use the radio controller 326 in order to decode the unencrypted encryption identification field 110. Once the encryption identification field 110 is decoded, controller will compare the information using a comparison means such as a conventional comparison algorithm with a list of unique encryption ID's stored in controller 326. If a match is found, it then determines if the presently selected encryption has the encryption ID which matches the number from the decoded encryption identification field 110. If the numbers match it means that the presently selected encryption is the proper encryption to use to decrypt the incoming background and control information signals. The encryption identification field 110 is only a number which allows radio 300 to determine if it has a correct encryption match. Therefore, an eavesdropper decoding the encryption identification field 110 will not gain any valuable encryption information, unless he has the encryptions and their relationship according to the encryption identification field 110.

If the encryption ID of the presently selected radio encryption does not match with the encryption identification that had been decoded, radio controller 326 will then select the encryption which has the proper matching ID to be the presently selected radio encryption. This will be accomplished by a loading means which consists of a routine stored in controller 326 informing encryption circuit 334 via bus 336 to switch encryptions. Radio 300 will use the newly selected encryption to decrypt all incoming encrypted control channel OSW's and encrypt all radio 300 generated ISW's. Normally selecting the new encryption means requires loading a new key which is stored in encryption circuit 334 into the encryption algorithm circuitry which is also part of encryption circuit 334. In the case where encryption circuit 334 has a plurality of encryption algorithms, the new algorithm has to be selected from the plurality of encryption algorithms, and then the appropriate key sequence must then be loaded into the algorithm circuitry.

If the encryption identification field 110 found in the status packet can not be matched with any of the logical key ID's found in a particular radio, radio 300 can begin to look for a new trunked system by scanning through all of its preprogrammed control channels which are stored in controller 326 in order to find a system which is using an encryption that matches one found in radio 300. Radio 300 could also remain on the previous system and request from the particular system central controller 404 to be sent a new encryption over the air in order for the radio to be able to decrypt the control channel information as well as voice channel information. This can be done by a conventional rekey request which is a feature found in some trunked systems.

During normal trunking operation the system central controller 404 will have a list of encryptions which the central controller 404 can use to encrypt the control channel information with (control information signals and background words). Each of the encryptions have an identifier (number) which is what is sent in the encryption identification field (logical key ID) 110 of the unencrypted system information signals. Radios 300 in system 400 will also have a set of encryptions which have been programmed in them normally by the trunked system coordinator (normally using a encryption loading device which loads encryptions into the individual radios), with each of the encryptions also having an encryption identifier stored in the radio's controller 326. By comparing the encryption identifier carried in the encryption identification field 110 with the identifiers in the particular radio receiving the information, a decision can be made in order to determine if radio 300 can decrypt the particular encrypted control channel signals.

Controller 326 is responsible for decoding the incoming encryption identification field 110 and comparing it with the encryption identifiers stored in the controller's memory locations by using a conventional comparison algorithm. If one of the encryption identifiers matches the decoded identifier field 110, controller sends a message via bus 336 to encryption circuit 334 informing it to change encryptions. By using a trunked system feature such as Over The Air Rekeying (OTAR TM) radios 300 in system 400 can request to be sent the encryption being used by the system central controller 404 in case that radios 300 determine that they do not have the encryption being used to encrypt the control channel. If the request for rekeying is granted, the system central controller 404 will via an RF channel send radio 300 the new encryption key information to use. This feature can only send new encryption key information of a particular encryption algorithm type (i.e. DES-XL). But since most trunked system users only use one type of encryption algorithm (i.e. DES-XL, etc.) it is a practical method of changing the control channel encryption by changing the encryption key used to scramble the algorithm with thereby changing the encryption used by system 400. Preferably, a rekeying request should not be granted until radio 300 has determined it is in the correct trunked system by determining that the system ID of the radio matches the ID for the system.

The next field which is part of the status packet of FIG. 1B is the status field 112 which is the segment of the FIG. 1B packet which is decoded first in order to inform radios 300 what type of packet is being received. The status field 112 informs radios 300 that the packet is a status packet which informs radios 300 as to the system ID 108 and logical key ID 110 information. The status packet in FIG. 1B is preferably transmitted by the system central controller 404 periodically in order to inform new radios 300 roaming into the system as to the system ID and as to the encryption which is being presently used by the system to encrypt the control channel data. The status packet also preferably includes a synch field 106 which is preferably an unencrypted set of data bits which are used by radios 300 in order to separate different OSW packets from each other. For example, synch field 106 could consist of the bit pattern "10101100" and any radio 300 receiving this bit pattern would know that the bits following the bit pattern form a new OSW packet which the radio has to decode.

Figure 1C:
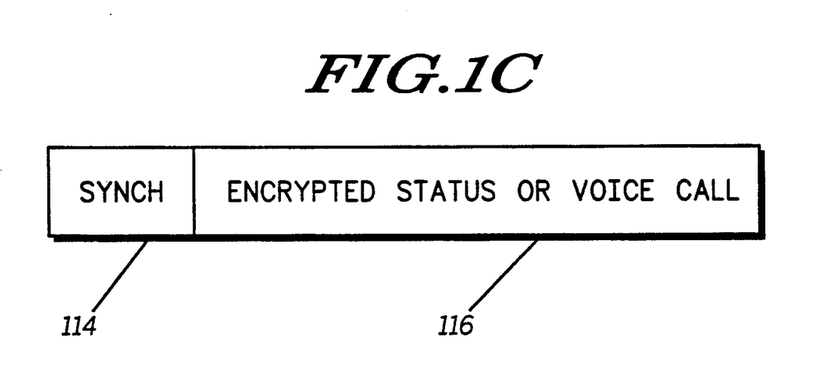
FIG. 1C shows a block diagram of an encrypted control information signal in accordance with the present invention.

In FIG. 1C an encrypted control information signal or call packet (information OSW) in accordance with the present invention is shown. The control information signal of FIG. 1C informs radios 300 in system 400 of a particular status or condition which affects the radios that the signal is addressed to, such as, a private call that is being sent to a particular radio 300, or the control information signal is informing a group of radios 300 to move to a predetermined voice channel 406, etc. The status or call field 116 in the control information signal is encrypted thereby protecting the control information against eavesdroppers trying to determine the type of activity traffic which is occurring in system 400. By encrypting the call packet information an eavesdropper monitoring the control channel would not be able to determine what groups of radios 300 were on what voice channel 406, and other similar trunked system activities being sent over control channel 402.

Figure 2:
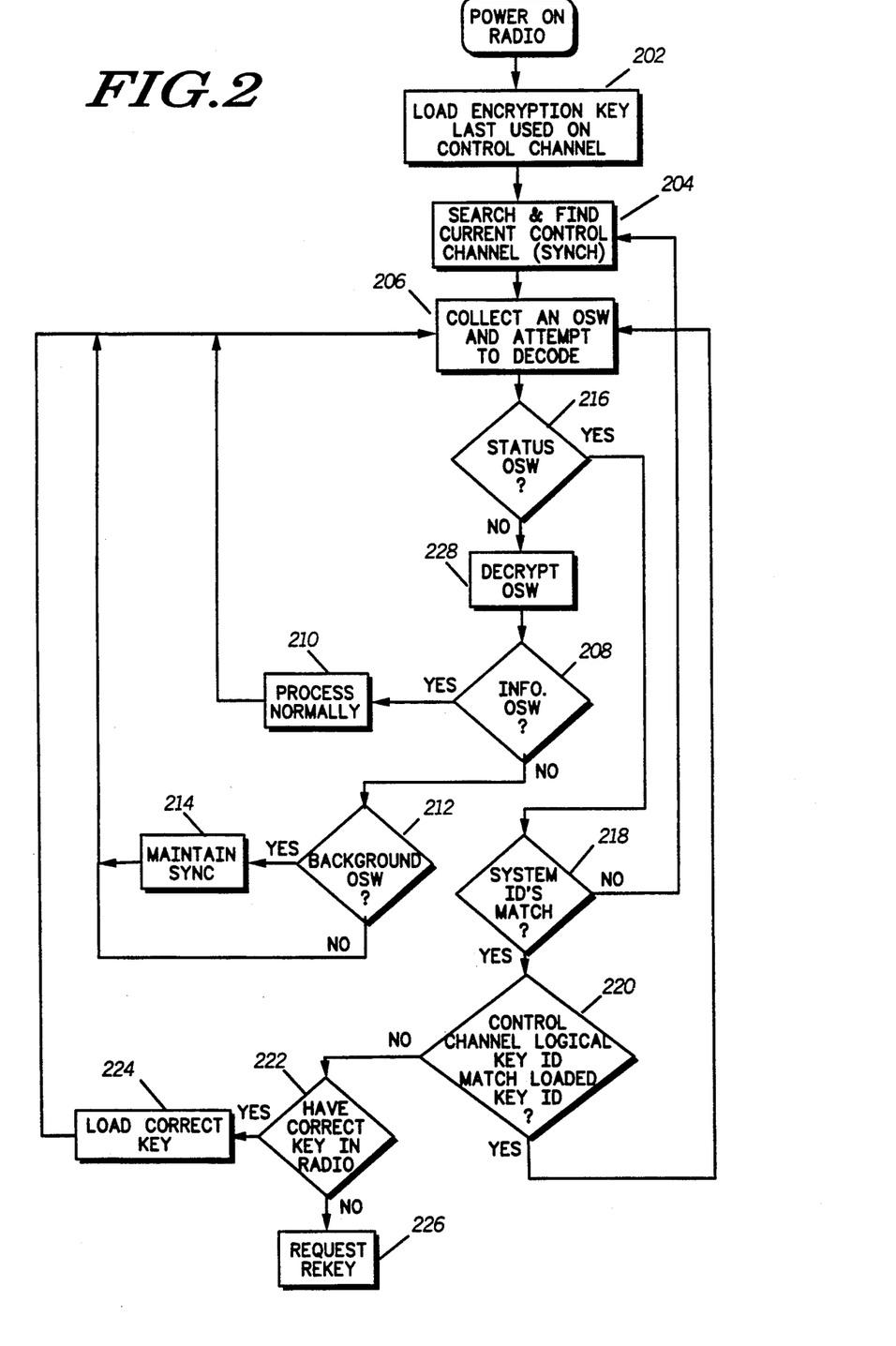
FIG. 2 is a flow diagram illustrating how a normal communication sequence occurs in accordance with the present invention.

In FIG. 2 a flow chart illustrating how a normal communication sequence occurs in accordance with the present invention is shown. On power up of radio 300 the radio controller 326 will instruct encryption circuit 334 to automatically load into its encryption memory the last encryption used (last encryption key and/or encryption algorithm). In step 204, radio 300 scans all the systems radio 300 has been programmed to operate in by scanning all of the control channel frequencies by way of a conventional scan routine which is stored in controller 326. Once radio 300 has found a control channel 402 with activity, radio 300 will attempt to successfully collect and decrypt an incoming OSW (either a background word packet, or control information signal, etc.) in step 206.

The routine then moves to step 216 where the routine then determines if the OSW packet is a status OSW as shown in FIG. 1B. If it is determined that the OSW is not a status OSW, the routine attempts to decrypt the OSW in step 228. Radio controller 326 will first attempt to decode the OSW, if not successful, it will send the data to decryption circuit 334 in order to decrypt the data. The decrypted data will then be sent back to controller 326 where controller 326 again tries to decoded the OSW data. The routine then moves to step 208 where if the OSW packet that was received is determined to be an information OSW, as shown in FIG. 1C, the routine moves to step 210 where the packet is processed normally. For example, if the OSW packet is informing radio 300 to go to a particular voice channel repeater 406 (voice channel grant OSW) the radio will go to the repeater the OSW is informing the radio to go to in order to begin the conversation with the other radios assigned to the repeater. This is assuming that radio 300 was successful in decrypting the OSW in step 228, since the information OSW's are encrypted. After finishing the conversation in the assigned repeater, the radio will return to the control channel and move back to step 206 in the routine in order to await for a new OSW to decode. If in step 208 the routine determines that the OSW is not an information OSW, or that radio 300 was unsuccessful in decrypting the OSW in step 228, the routine moves to step 212.

In step 212, if the OSW which had been collected is determined to be a background word packet (FIG. 1A) and it was successfully decrypted in step 228, the radio in step 214 will maintain synch with the control channel and return to step 206 where the radio 300 will continue decoding incoming OSW's. If it is determined in step 212 that the OSW is not a background OSW or if radio 300 was unsuccessful in decrypting the OSW, the routine will also move back to step 206 in order to try to successfully decode another incoming OSW.

If back in step 216 the received OSW packet is determined to be an unencrypted status OSW (as shown in FIG. 1B) the system ID field 108 in the status OSW is matched in step 218 to the system ID(s) stored in the radio in order to determine if the radio is allowed to operate in that particular system. If the answer is that there is no match, the routine returns to step 206, but if a match is found, the routine continues on to step 220. In step 220, key ID field 110 from the OSW is matched to the ID of the encryption which is presently being used by radio 300 to decrypt the messages from the control channel 402. If the ID's match, the message is decrypted, and radio 300 goes back to step 206 in order to continue receiving OSW packets. If in step 220 the ID's do not match, the routine goes to step 222 which determines by way of a conventional comparison algorithm stored in controller 326 if radio 300 has an ID (stored in encryption circuit 334) which matches the key ID field 110 from the received OSW. For example, if radio 300 has three encryptions stored each having a unique encryption ID associated with them, the comparison algorithm will compare the three ID's with the key ID field 110 from the system information signal (status OSW) in order to see if the radio is capable of successfully decrypting the OSW's that follow the unencrypted status OSW. If a correct match is found in step 222, the correct encryption is loaded into encryption circuitry 334 in step 224, and radio 300 returns to normal operation in step 206. If radio 300 does not have a proper encryption match, radio 300 can request a rekey in step 226 from the system central controller 404 by using a trunking feature such as over the air rekeying which is a way by which radios in a trunked system can receive new encryptions sent to them over an RF channel. A radio 300 will send a message to the system central controller 404 requesting a new encryption (called a request rekey command) which will inform the central controller 404 that the radio requires a new encryption key. Radio 300 basically transmits an ISW message to the system central controller 404 which tells the controller 404 that a particular radio requires a new encryption sent to it, at which point the central controller 404 upon receiving the message can determine if the radio 300 which has requested the rekey can receive the key information (i.e. that particular radio 300 has not been stolen). Since all radios 300 in a trunked system transmit a radio identification ID the central controller 404 will know if the radio requesting the rekey has been compromised (i.e. stolen or is an unauthorized radio).

The present invention provides an effective means for allowing a trunked radio system 400 to have the benefits of an encrypted control channel 402. The invention allows all radios 300 which are part of a trunked radio system 400 to automatically and without radio user intervention, determine if radio 300 is capable of decrypting the encrypted control channel 402 information packets. If radio 300 determines after decoding the encryption identification field 110 that it is capable of decrypting the encrypted control channel packets, it will automatically switch either encryption key and/or algorithm in order to properly decode the information. Once radio 300 has decoded the information it will remember the encryption algorithm and key which is being used by that particular system's central controller 404 and will use the same encryption to transmit ISW packets to the system central controller 404. This feature will be operational even if the radio user is using a different encryption (key and/or algorithm) during his normal voice channel 406 conversations. Radio controller 326 can automatically control the switching of the encryptions between the encryptions being used for control channel operation and for voice channel operation without the need for radio user intervention.

What is claimed is:

1. A trunked radio communication system comprising:
   a plurality of communication devices; and
   a control resource for controlling the plurality of communication devices in the trunked radio communication system using encrypted control information signals, and unencrypted system information signals with the unencrypted system information signals including an unencrypted encryption identification field which identifies the encryption being used to encrypt the control information signals, the encrypted control information signals and the unencrypted identification signals being transmitted as a data stream from the control resource with the unencrypted identification signals occurring periodically during the transmission of the data stream.

2. A trunked communication system as defined in claim 1, wherein the system information signals and control information signals include an unencrypted synchronization field.

3. A trunked communication system as defined in claim 1, wherein the control resource is a trunked system central controller which transmits the control information signals and the system information signals over a control channel.

4. A trunked communication system as defined in claim 3, wherein the trunked system central controller also transmits encrypted background words over the control channel whenever a control information signal or a system information signal is not being transmitted in order to keep the plurality of communication devices in synch with the control channel.

5. A radio, capable of operating in a trunked communication system having a control resource which controls the radio using encrypted control information signals, and unencrypted system information signals with the unencrypted system information signals including an unencrypted encryption identification field, the encrypted control information signals and the unencrypted identification signals being transmitted as a data stream from the control resource with the unencrypted identification signals occurring periodically during the transmission of the data stream, the radio comprising:
   a receiver for receiving the encrypted control information and unencrypted system information signals; and
   a decoding means for decoding the encryption identification field which is part of the system information signal in order to determine if the radio is capable of decrypting the encrypted control information signals.

6. The radio of claim 5, further comprising:
a decryption means responsive to the decoding means for decrypting the encrypted control information signals once it is determined that the radio is capable of decrypting the control information signals.

7. The radio of claim 6, wherein the decryption means further comprises a plurality of encryptions for use in decrypting the encrypted control information signals.

8. The radio of claim 7, wherein the decoding means further comprises a comparison means for comparing encryption identifiers which are stored in the radio with the decoded encryption identification field in order to determine if the radio has the proper encryption from among the plurality of encryptions for decrypting the encrypted control information signals.

9. A radio, capable of operating in a radio frequency trunked communication system having a system central controller which controls the radios in the system using encrypted control information signals, and unencrypted system information signals which include an unencrypted encryption identification field, with the encrypted control information signals and unencrypted system information signals being transmitted over a control channel as a data stream by the system central controller, the unencrypted system information signals being transmitted periodically during the transmission of the data stream, the radio comprising:
   a receiver for receiving the encrypted control information signals and unencrypted system information signals from the control channel;
   a decoding means for decoding the unencrypted encryption identification field which is part of the system information signal in order to determine if the radio is capable of decrypting the encrypted control information signals; and
   a decryption means responsive to the decoding means for decrypting the encrypted control information signals once it is determined that the radio is capable of decrypting the control information signal.

10. The radio of claim 9, wherein the decryption means further comprises a plurality of encryptions for use in decrypting the encrypted control information signals, and the decoding means further comprises a comparison means for comparing encryption identifiers which are stored in the radio with the decoded encryption identification field in order to determine if the radio has the proper encryption from among the plurality of encryptions for decrypting the encrypted control information signals.

11. A method for providing for an encrypted control channel in a trunked radio communication system, comprising the steps of:
   encrypting control information signals;
   generating unencrypted system information signals which include an encryption information field which identifies the encryption which is being used to encrypt the control information signals; and
   transmitting a data stream which includes the encrypted control information signals and the unencrypted system information signals over the control channel, the unencrypted system information signals being transmitted periodically during the transmission of the data stream.

12. The method for providing an encrypted control channel of claim 11, wherein the step of generating unencrypted system information signals further includes the step of:
   developing an encryption identification number which is related to the encryption being used to encrypt the control information signals.

* * * * *